United States Patent
Bock et al.

(10) Patent No.: US 7,711,073 B2
(45) Date of Patent: May 4, 2010

(54) METHOD AND CIRCUIT ARRANGEMENT FOR DETERMINING THE FREQUENCY OF A RECEIVED SIGNAL FOR DEMODULATION OF RECEIVED SIGNALS

(75) Inventors: Christian Bock, Freiburg (DE); Carsten Noeske, Glottertal (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1208 days.

(21) Appl. No.: 11/127,805

(22) Filed: May 12, 2005

(65) Prior Publication Data

US 2005/0254602 A1 Nov. 17, 2005

(30) Foreign Application Priority Data

May 12, 2004 (DE) .................. 10 2004 023 889

(51) Int. Cl.
*H03K 5/159* (2006.01)
(52) U.S. Cl. .................. 375/332; 375/261; 375/268; 375/316; 375/329; 375/339; 375/344; 375/361
(58) Field of Classification Search .............. 375/332, 375/344, 261, 268, 320, 326, 331, 361
See application file for complete search history.

(56) References Cited

U.S. PATENT DOCUMENTS

| | | | | |
|---|---|---|---|---|
| 4,843,616 A | * | 6/1989 | Hoffmann | 375/327 |
| 4,860,320 A | | 8/1989 | Hoffmann | 375/83 |
| 5,079,512 A | | 1/1992 | Muto | 329/304 |
| 5,105,442 A | * | 4/1992 | Wei | 375/262 |
| 5,343,499 A | * | 8/1994 | Jasper et al. | 375/261 |
| 5,471,508 A | | 11/1995 | Koslov | 375/344 |
| 5,581,582 A | * | 12/1996 | Choi | 375/344 |

(Continued)

FOREIGN PATENT DOCUMENTS

DE   41 00 099   1/1992   ............ 27/38

(Continued)

OTHER PUBLICATIONS

M. Hoffmann, "A New Carrier Regeneration Scheme for Qam Signals," IEEE Proceedings of the International Symposium on Circuits and Systems, Jun. 1988, pp. 599-602, XP010069621.

*Primary Examiner*—Mohammad H Ghayour
*Assistant Examiner*—Sophia Vlahos
(74) *Attorney, Agent, or Firm*—DLA Piper LLP (US)

(57) ABSTRACT

The invention relates to a method and a circuit arrangement for determining the carrier frequency difference during the demodulating of received symbols (P1, P2) in the complex phase space (I, Q; R, α) of a quadrature modulation method (QAM), wherein to determine the frequency the received symbols are compared with symbols (S1, S2) at nominal positions in the complex signal space. In order to make the determination independent of a rotation of the coordinate system of the received signals with respect to the coordinate system of the symbols, it is proposed to determine the angle (∠(P1, P2)) between two received signal values (P1, P2) and compare it to possible nominal angles of the quadrature modulation method. An angle deviation between the determined angle of the received signal values and the nominal angle can be used as a direct measure of a frequency deviation (Δf).

15 Claims, 4 Drawing Sheets

U.S. PATENT DOCUMENTS

| | | | |
|---|---|---|---|
| 6,567,480 B1 | 5/2003 | Brardjanian et al. | 27/22 |
| 6,771,718 B1 * | 8/2004 | Huttunen | 375/344 |
| 7,006,560 B2 * | 2/2006 | Kindler et al. | 375/222 |

FOREIGN PATENT DOCUMENTS

| | | | |
|---|---|---|---|
| DE | 4410607 | 3/1995 | 3/2 |
| DE | 19540250 | 2/1997 | 27/38 |
| EP | 0571788 | 5/1993 | 27/38 |
| WO | WO 00/79754 | 12/2000 | 27/38 |
| WO | WO 0079754 | 12/2000 | 27/38 |

* cited by examiner

METHOD AND CIRCUIT ARRANGEMENT FOR DETERMINING THE FREQUENCY OF A RECEIVED SIGNAL FOR DEMODULATION OF RECEIVED SIGNALS

PRIORITY INFORMATION

This invention claims priority to German application 10 2004 023 889.8 filed May 12, 2004.

BACKGROUND OF THE INVENTION

The invention relates to a method for determining the frequency for demodulation of received symbols or signal components in the complex phase space of a quadrature modulation method.

Correct determination of the frequency, i.e., the carrier frequency, is an important factor for a synchronization of a receiver or a receiving circuit arrangement for the reception of digital signals, coupled with a quadrature signal pair. The symbols represent, in encoded form, a one-place or multiple-place digital value. The encoding is done for transmission via the quadrature signal pair, which corresponds to a pointer, which assumes discrete positions in the Cartesian amplitude and phase space of the quadrature signal pair at certain moments in time. Quadrature Amplitude Modulation (QAM) and Phase Shift Keying (PSK) are transmission methods of this kind.

In a traditional receiver for reception of digital signals, a complex multiplier or mixer, which is triggered by a local oscillator, mixes the received QAM signal, modulated onto a carrier, in correct phase and frequency, into the base band of the circuit arrangement. The circuit arrangement usually has a phase-locked loop for the control process. In digital processing, this can come before or after an analog-to-digital (A/D) conversion. The signal is either sampled and digitized with the symbol clock cycle or a multiple thereof, or the digitization clock cycle is free-running relative to the required symbol clock cycle. In this case, the signal is converted via a purely digital sampling rate conversion to the symbol clock cycle or a multiple thereof. Gain controls make sure that the particular modulation range is utilized and that the received signals are correctly mapped onto the symbol decision-making stage. An adaptive equalizer reduces the intersymbol interference which is the result of linear distortions of the transmitter, the transmission pathway, or the receiver.

In high-order demodulators for QAM or PSK signals, the automatic control circuits for the frequency and phase control of the local oscillator, for gain control, for recovery of the symbol clock cycle, and for the adaptive equalizer require both the received symbols and the elements of the predetermined symbol alphabet that are considered by a decision-making stage as being the most probable. This type of control via the signal decided upon is known as "decision-feedback" control.

Since the decision-feedback controls are coupled together in the digital demodulators in the prior art, the locking process is difficult whenever the control for the local oscillator, which mixes the reception signal into the base band, is not yet stable in frequency and phase. Often, locking is only successful when the particular frequencies and phases are situated relatively close to their nominal values.

Demodulators for QAM or PSK signals ordinarily use a phase control which compares the received and sampled complex signal values to coordinates in the signal space that are assigned to symbols. Most often, one uses equidistant decision-making thresholds in both the I and Q direction of the complex signal space. A received phase point is coordinated with the nominal point of a symbol that represents the mid-point of an I/Q decision square lying in the complex I/Q plane.

A method which uses fields with radii and sectors, instead of the quadratic decision-making fields, is known from DE 36 19 744. In EP 0 281 652, groups of closely adjacent radii are first determined, and then in a following step the most suitable phase angle is determined on one of the radii in question. Decision-making devices with a limited symbol selection (reduced constellation) are used in U.S. Pat. No. 5,471,508 to avoid wrong rotations in the higher-order types of modulation.

In the known methods, the phase capture region is very small, especially for higher-order modulations. But until such time as the carrier phase control of the circuit arrangement is locked in, the symbols decided upon are often not correct, and as a result a wrong direction of rotation will be calculated for certain symbols. If the sum signal of all the correction signals is plotted against the phase deviation, unwanted zero points are obtained in the higher-order modulation methods, which result in a faulty lock-in.

Various methods are known for enlarging the capture range and avoiding false zero points for the sum correction signal. For example, in U.S. Pat. No. 5,471,508; EP 0571788; DE 36 19 744; DE 41 00 099; DE 44 10 607 and DE 199 28 206, one always starts with fixed nominal coordinates of the symbols in the signal space. The phase capture range cannot be expanded without special logic measures, for example according to EP 0571788.

All procedures for increasing the phase control range, however, result only in slight improvements in the frequent need to correct a frequency difference between the reception signal and the local oscillator and do not fundamentally solve the problem of a need for a frequency control method. Such a frequency difference signifies a rotation of the coordinate system of the input signal relative to the coordinate system of the circuit arrangement with constantly changing phase offset.

If a frequency difference has to be corrected, the loop gain of the carrier controls needs to be set so high that the phase, after correctly passing through the zero point, where no phase difference exists between the input signal and the local oscillator, is captured and held inside the small range in which the decision maker furnishes only correct or mostly correct decisions, (i.e., the local oscillator must be placed at the correct frequency and phase). However, the necessary stability of the automatic control loop restricts the possible loop gain.

Therefore, there is a need for a system and method for determining the frequency of a received signal for the demodulation of received symbols or signal components in the complex signal space of a modulation method with a better mode of operation.

SUMMARY OF THE INVENTION

In determining the frequency of a received quadrature modulation signal one assumes that signals received for the frequency control are compared with nominal positions of symbols in the complex signal space. For an easier and more accurate determination of a frequency difference, it is advantageous to determine, for at least two signal values received, the angle between them as the reception angle, to compare this angle with angles between corresponding nominal positions that are possible for the quadrature modulation method used, or nominal angles, and to select the nominal angle which comes closest. The angle deviation between the reception angle and the next closest nominal angle is a measure of the frequency difference between the input signal and the local oscillator of the circuit arrangement.

Thus, the method is based on considering difference angles, instead of the deviation of the received signal values from fixed nominal symbols. Therefore, the momentary angle position of the received signal space is not relevant. It can be tilted in any desired fashion relative to the nominal coordinate system, or even be rotated within certain limits. In any case, a proper frequency correction signal will be generated within the large frequency capture range made possible in this way. The capture range and capture reliability can be further enhanced by concatenation measures.

Of course, such a procedure can be carried out progressively, by undertaking a new variation continuously for each clock cycle or for each given number of elapsed clock cycles.

The reception angle is determined for consecutively received signal values and compared with corresponding possible nominal angles. A progressive execution of this method for signal values which directly follow each other or do so at given intervals thereby identifies the older of the symbols involved in forming the difference by the previous angle determination and enables a more robust and faster search method due to the resulting delimitation of the difference combinations of nominal angles.

This concatenation can also work for several symbols and determine the most probable new symbol, in the manner of the Viterbi algorithm.

It is also useful to use the detected radii of the signal values involved and their coordination with nominal radii to delimit the possible nominal angles, since only those symbols can be involved in their formation that lie on the particular nominal radii. One makes use of the fact that the radial component of the received signal is not dependent on frequency or phase offsets. Accordingly, it is useful to determine the angle for signals in the region of different possible radii for the quadrature modulation method and compare it with correspondingly possible nominal angles.

It is also advantageous to determine the angle for signal values on the radii which can be determined most unambiguously in the symbol alphabet. This rules out false associations with symbols on closely neighboring radii, for example, the radii 2-4 in a 64-QAM method. It is preferable, for example, to do the determination on the first and the sixth radius in 64 QAM, since these radii have no close neighboring radii and an especially suitable angle exists between the corresponding symbols.

It is also advantageous to only allow reception angles of signals that are coordinated with nominal angles in the region of positions of selected symbols. This ensures that only those signals can be used for the angle determination that are especially reliable for analysis, in terms of neighboring symbols, radii, et cetera, and also the angle relationship. Accordingly, an angle is determined for received signal values in the region of positions of selected nominal symbols.

Also of advantage is a method in which a plurality of angles are determined, compared, and jointly considered for determination of the frequency offset, for a combined and/or iterative improvement of the frequency determination. In order to avoid wrong decisions and, thus, wrong control variables, one should preferably make use thereafter of those angle deviations that are definitely smaller than half the difference between the particular coordinated nominal angle and the particular next most probable nominal angle for consideration.

Determining a plurality of angle deviations between reception angles and nominal angles enables an improved frequency determination by iteration or taking the mean. In particular, it is possible to use the progressively determined deviation between reception angles and nominal angles as an input signal for a conventional frequency control method or the integral branch of a conventional phase control of the local oscillator.

The deviation between the reception angle and nominal angle or an improved value formed from many angle deviations may also be used for a onetime frequency correction of the local oscillator, so that during subsequent steps of the determination one can thereafter assume a signal that is correct in frequency and all that is needed is an adjustment, for example for further optimization or to compensate for outliers.

Especially in higher-order modulation methods, several symbols can have the same position angle in the coordinate system. Furthermore, various other symbol combinations can form the same nominal difference angle. On the other hand, if the determining of the nominal angle is used for identifying the symbols involved, this ambiguity is preferably eliminated by concatenation or the above-described coordinating of the received signal values with nominal radii or a combination of the two methods. The symbols thus identified can be made available to following stages. In this way, the demodulator can work, even though its frequency and phase control has not yet locked in.

Advantageously, the angles of all the received signal values can be mapped in a single quadrant of the complex plane to determine the angle between then. This reduces the number of nominal angles that need to be considered.

It is also advantageous to examine the region of consideration of the received signals for tolerance regions and possible nominal symbol positions, or for nominal radii in particular, so that outliers among the received signals can be eliminated from the further analysis and the determination is not affected by outliers. A method is preferable in which received signal values are coordinated with groups of radii about possible nominal radii within tolerance regions, and these are used to define a selection of nominal angles.

If the information obtained from determining the difference angle as to the identity of the symbols involved is to be used for further processing of these symbols, it is preferable to perform, after the angle determination in only one quadrant and before the further signal processing, an appropriate correction by reverse rotation of the complex symbols into the correct quadrant. This is done preferably by a method in which, after the angle determination in only one quadrant and prior to the further signal processing, the signs of a particular symbol are put back appropriately or the symbol is rotated back to the correct quadrant.

Once the initially present frequency deviation has been sufficiently corrected, the information derived from the difference angle on the identification of the symbols involved makes it possible to use the absolute angle of one or more symbols for the phase control.

The method or corresponding circuit arrangement is especially attractive for binary or complex digital modulation methods, such as PSK and QAM. Such modulation methods are used by many of the newer radio, television, and data services via cable, satellite, and sometimes land-based.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
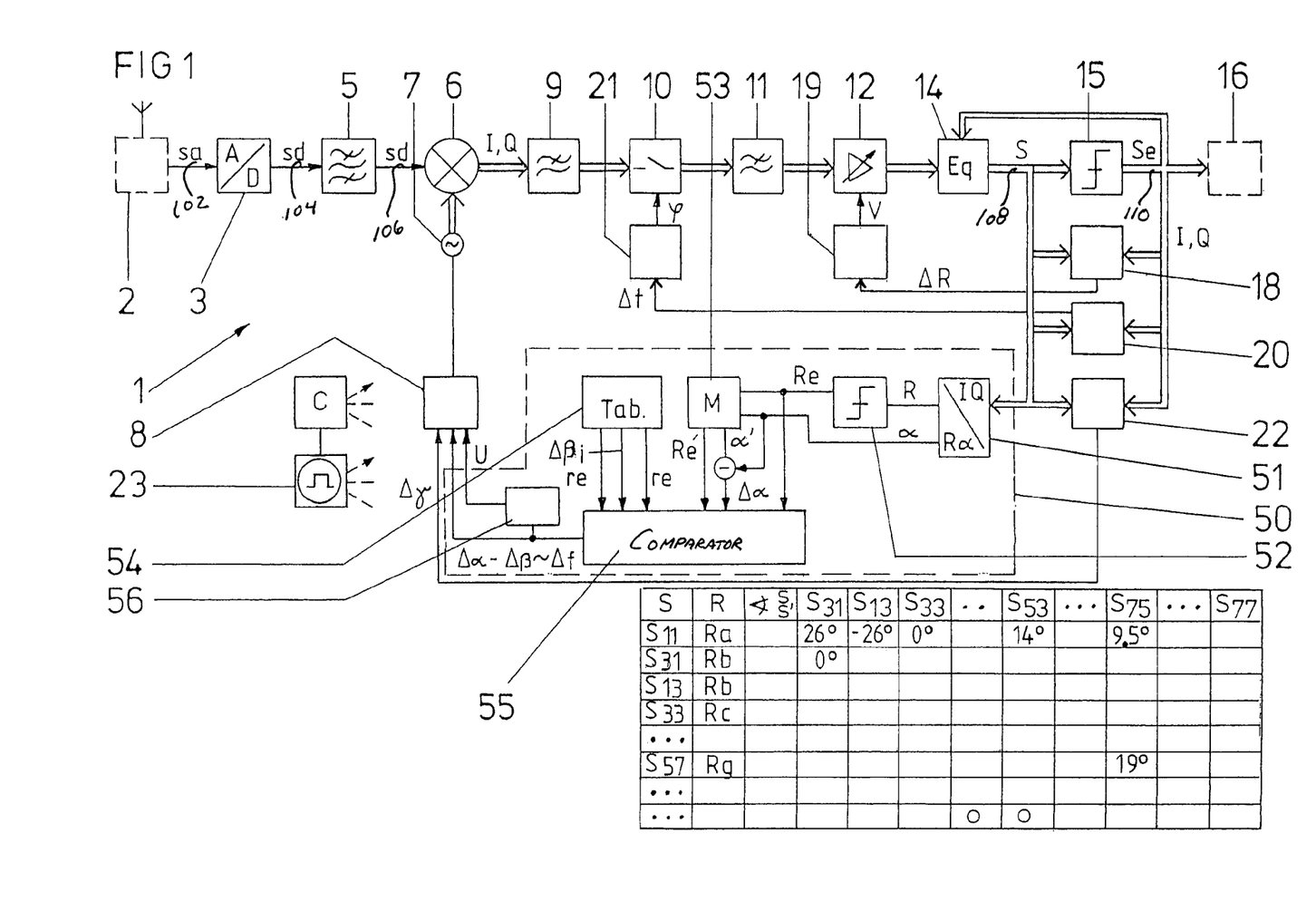
FIG. 1 is a block diagram illustration of a system for determining symbols from a digitized signal, which is coupled to at least one quadrature signal pair of a modulation method, the circuit arrangement having a device for determining the frequency of the reception signal.

A demodulator 1 for determining symbols Se from a digitized signal sd, S, which is coupled to a quadrature signal pair of a modulation method, for example according to a QAM standard, includes a plurality of individual components. These can all or individually also be part of an integrated circuit. In particular, the following described components can be left out or supplemented with additional components, depending on the application. It is also possible to forward the signals as real signals, complex signals, or individual complex signal components, depending on the application and special circuit arrangement.

The demodulator 1 receives an analog signal on a line 102 from a signal source 2 such as a tuner. This analog signal, which is usually present in a band-limited intermediate frequency layer, is sent to an analog-to-digital converter 3 which provides a digital signal on a line 104. The digital signal is input to a bandpass filter 5, which removes steady components and disruptive harmonics from the digital signal, and provides a bandpass filtered signal on a line 106.

The bandpass filtered signal on the line 106 is input to a quadrature converter 6, which converts the signal into baseband. The baseband meets the requirements of the demodulator 1 and the modulation method used. The quadrature converter 6 provides signal in-phase and quadrature signal components I, Q, respectively, of the Cartesian coordinate system. For the frequency conversion, the quadrature converter 6 is usually supplied with two carriers, offset by 90.degree., from a local oscillator 7, whose frequency and phase is controlled by a carrier control unit 8. These are the main parts of the phase-coupled control process. The quadrature signal components I, Q are sent to a lowpass filter 9, which attenuates disruptive harmonics and limits the bandwidth of the signal for the subsequent sampling. The thus filtered quadrature signal pair I, Q or the two quadrature signal components I, Q are then sent to a symbol-sampling device 10, which has a sampling control unit. The control of the symbol sampling device 10 occurs via an input, where the sampling signal $t_i$ is presented. The symbol-sampling times $t_i$ are oriented in the normal operating state to the symbol rate $1/T$ or a multiple thereof and usually also to the precise phase position of the received digital signal. The lowpass-filter 9 and the symbol-sampling device 10 produce a temporal interpolation between the sampled values of the AD converter 3 to a clock cycle at the symbol rate or an whole-number multiple thereof.

The output signal of the sampling device 10 is filtered by a lowpass filter 11 with a Nyquist characteristic, and the resultant signal is input to a feedback gain control unit 12 with a controller 19. The control of the gain control unit 12 serves to make optimal use of the modulation range of a symbol decision-making unit 15. The signal output by the gain control unit 12 is provided to an equalizer 14, which removes disruptive distortions from the two components of the quadrature signal pair I, Q and produces a signal S on a line 108. After this, symbols Se on a line 110 are formed by the symbol decision-making unit 15 from such prepared signals.

These symbols Se on the line 110 go to other digital signal processing devices 16, and the signals S on the line 108 and the symbols Se are then taken, directly or indirectly, to the automatic control circuits or components with decision feedback in the demodulator 1. The symbols Se are used in this way, in particular, by the equalizer 14, the gain control unit 12, its controller 19, the carrier control unit 8, and the symbol-sampling device 10. These automatic control circuits, depending on the circuit arrangement, receive either both quadrature signal components I, Q of the signal S or symbol Se in Cartesian coordinates or in polar coordinates.

The gain control unit 12 is actuated by the gain controller 19, which receives a signal that represents the radius difference $\Delta R$ determined in a radius comparator 18. For the radius comparison, the radius comparator 18 receives the signal S on the line 108 before being taken to the symbol decision unit and also the symbol Se on the line 110 decided upon in the symbol decision unit 15.

Thus, the gain control unit 12 receives a gain factor V that is produced by the gain controller 19 from a radius error $\Delta R$, and the gain controller 19 is preferably configured as a proportional-integral (PI) controller.

Alternatively, there can also be a gain control unit 12 that governs itself by a comparison of the input signal and output signal, making use of reference parameters saved in memory. This offers the advantage that the radius comparator 18 and the gain controller 19 are eliminated or can be partly incorporated into the gain control unit 12. Furthermore, such an arrangement prevents two independent control processes being part of the automatic control loop, namely, a gain control in the gain control unit 12 and a further automatic control in the equalizer 14.

The signal S and the symbol Se are input to a time error determining device 20. The time error determining device 20 determines the clock error, generally known as the timing error $\Delta t$, in known fashion. This timing error $\Delta t$ is provided to a sampling device controller 21, which is preferably configured as a PI controller. The resulting control voltage is then provided to the sampling device 10, which samples the input signal after it has been converted into the Cartesian coordinates I, Q.

Moreover, the signal S and the symbol Se are input to an angle error determining device 22, which determines an angle error $\Delta \gamma$, which is taken to the carrier control unit 8 as a P and an I component for actuation of the local oscillator 7.

The carrier control unit 8 also receives a frequency offset $\Delta f$ and also preferably a switching signal U. The switching signal U and the frequency offset $\Delta f$ are provided by a frequency preparation unit 50.

The frequency preparation unit 50 receives the received and preprocessed signal S in the complex Cartesian coordinate space I, Q. This signal is converted by a coordinate converter 51 into polar coordinates R, $\alpha$, and the radial component is taken to another symbol decision unit 52. The radial component Re output by this symbol unit 52 and the angle component $\alpha$ of the coordinate converter 51 are input to a memory 53, M. The radial component Re decided upon by the decision unit 52 is also input to a comparator 55. The comparator 55 receives the decided-upon radial component Re' from the memory 53 and a difference angle component $\Delta\alpha$, being the difference between the angle component $\alpha$ of the coordinate converter 51 and the angle component $\alpha'$ from the memory M.

In this additional decision unit 52 a decision is made as to the radius or groups of radii. As an alternative, all the radii or no radius can be let through. The last radius quantity determined and the last determined angle or several of the last determined radius quantities and angles are stored in the memory 53.

All occurring difference angles with corresponding radius pairs of the symbols belonging to the symbol alphabet are placed in a table 54, which is configured as an additional memory or as an additional memory partition in the memory 53. The table 54 or the additional partition in the memory 53 thus serve as a device for preparation of a nominal angle and/or nominal radii. These nominal values, a current radius quantity re, a current difference angle $\Delta\beta$, and a radius quantity re' that represents a preceding radius value are taken from the table 54 to the comparator 55. The comparator 55 compares all occurring difference angles with corresponding radius pairs of the nominal symbols with the corresponding values in the table 54. The comparator 55 seeks the most likely nominal difference angle $\Delta\beta$ for the determined or measured actual difference angle $\Delta\alpha$, allowing for a comparison of the radii Re, Re' that were decided upon with possible combinations of re, re' from the table 54. It is an advantage that overarching decisions spanning more than one symbol interval are possible. Also advantageously, the result can be rejected when the uncertainty is too high (i.e., above or below limit values). A frequency error or frequency offset $\Delta f$ is output as the result of the difference angle between the determined actual difference angle $\Delta\alpha$ from the coordinate converter 51 and the previously saved value of the memory 53, on the one hand, and on the other the most likely nominal difference angle $\Delta\beta$ from the table 54, so that the frequency error is $\Delta f = f_{Symbol} \cdot (\Delta\alpha - \Delta\beta)/2\pi$. This frequency error $\Delta f$ is taken to the carrier control unit 8.

Preferably, this frequency error $\Delta f$ is also input to a selector switch 56, which monitors the size of the frequency error $\Delta f$. As the frequency error $\Delta f$ is generally large in the beginning, the frequency error $\Delta f$ is taken as the control variable for the carrier control unit 8. Once $\Delta f$ has become very small, being preferably below a threshold value, the angle error $\Delta\gamma$ will be used, being obtained from the usual and familiar decision-making process or the angle error determining device 22.

A preferred carrier control unit 8 is configured as a PI controller. According to one embodiment, the switch signal U of the selector switch 56 becomes a simple switching from the frequency offset or frequency error $\Delta f$ to the angle error $\Delta\gamma$ at the input of the PI element.

Figure 5:
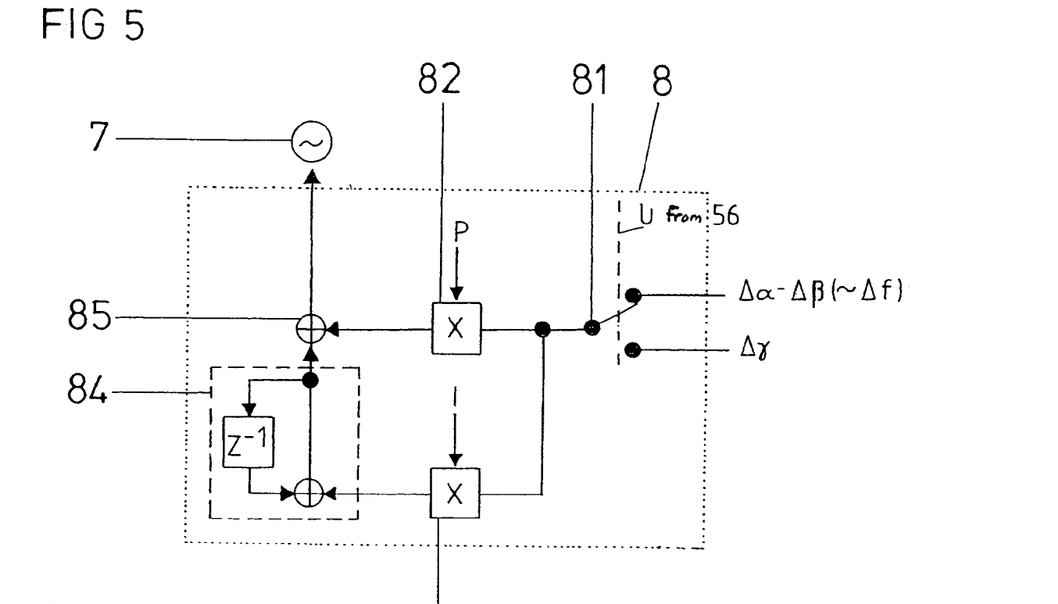
FIGS. 5 and 6 are arrangements for a frequency or phase control switch.

In the embodiment of the carrier control unit 8 shown as an example in FIG. 5, the switch signal U of the selector switch 56 is taken to a selector switch 81 located therein. The switch 81 switches between the two input signals and places them at a multiplier 82 for multiplication of a P component and at a multiplier 83 for multiplication of an I component. The output signal of the I multiplier 83 is fed to an integrator 84, whose output signal is fed to an adder 85, the second input of which receives the output signal of the P multiplier 82. The output signal of this adder 85 is taken as the control signal to the local oscillator 7.

Figure 6:
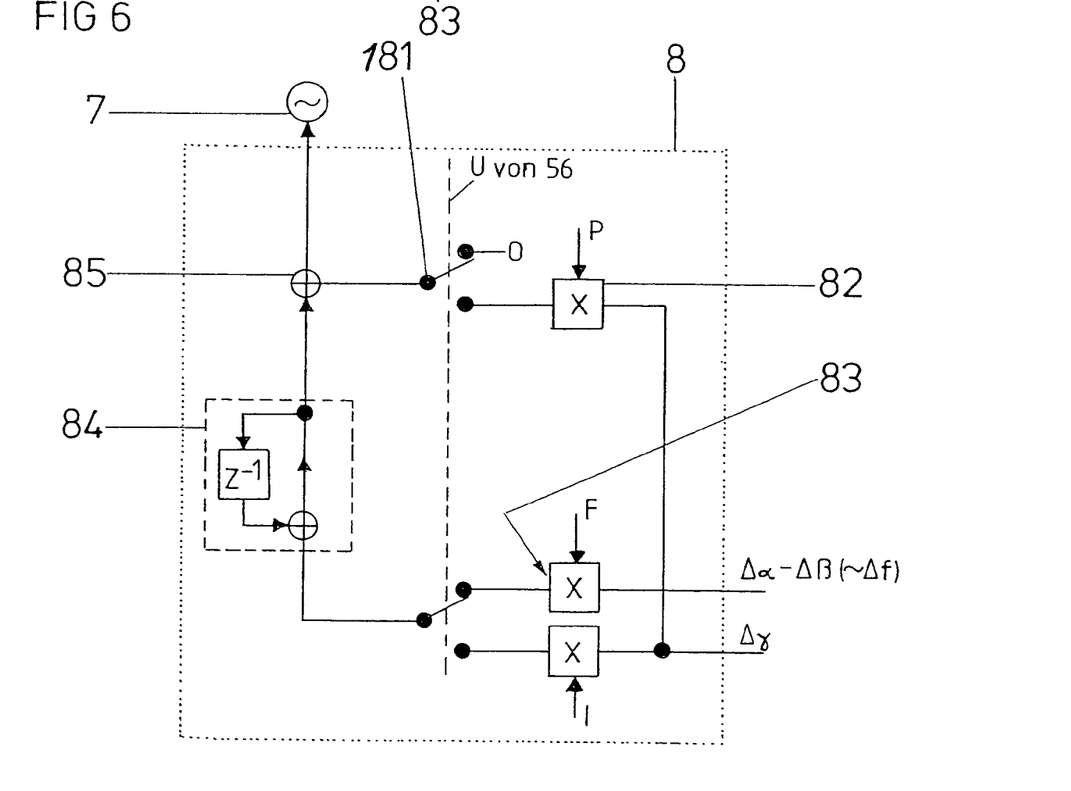

According to a preferred embodiment, which is shown in FIG. 6, the frequency offset or frequency error $\Delta f$, which is equal or proportional to the determined angle error $\Delta\alpha - \Delta\beta$, is taken directly to the I element of the carrier control unit 8 and multiplied with its own coefficient F. The angle error $\Delta\gamma$ is taken to both the I element and the P element and multiplied with an I value or a P value. The switch signal U of the selector switch 56 is presented at a switch 181, which in a first switching stage switches between the P-multiplied component and an empty position, and which in a second switching stage switches between the I multiplied angle error $\Delta\gamma$ and the frequency offset $\Delta f$, multiplied by the coefficient F. As in the above described carrier control device, the switched output value with the I component is taken in turn to an integrator 84 and through this to an adder 85, which has presented at the second input the switched P component or a zero signal. Its output signal, in turn, is taken to the local oscillator 7.

In order to control the circuit arrangement 1 and furnish it with a basic clock cycle, besides other components necessary to its operation it has, in particular, a clock generator 23 and a controller C.

While a circuit arrangement with a conversion device 6 for converting the digital signal into the complex Cartesian space I, Q and a converter 51 for converting into polar coordinates are described, circuit arrangements are also possible in which the first converter already converts the digital signal sd into a complex signal with polar coordinates $\alpha$, R. In particular, the coordinate converter 51 can also be omitted, if the other corresponding components of the circuit arrangement are designed for proper processing of the complex signal in the Cartesian coordinate space I, Q.

In the coordinate converter 51, the supplied complex signal in the Cartesian coordinate system (i.e., a sampled quadrature signal pair I, Q) is converted into the polar coordinates R, $\alpha$. Thus, with the polar coordinates there are formed a radius component R and an angle component a according to $I = R \cdot \cos(\alpha)$ and $Q = R \cdot \sin(\alpha)$ and according to the relations $R = \sqrt{(I^2 = Q^2)}$ and $\alpha = \arctan(Q/I)$.

Alternatively, coordinate converters of another kind may also be used. In digital signal processing, the so-called Cordic method is often used for this, whereby the conversion uses only additions and binary multiplications, which can be realized for binary numbers by simple arithmetic shifts. As an alternative, other approximation methods or the use of tables are also possible. The inverse conversion (i.e., the conversion from polar signal components R and $\alpha$ to their quadrature components I and Q) can likewise be done with a Cordic converter, a table, or an approximation method.

Figure 2:
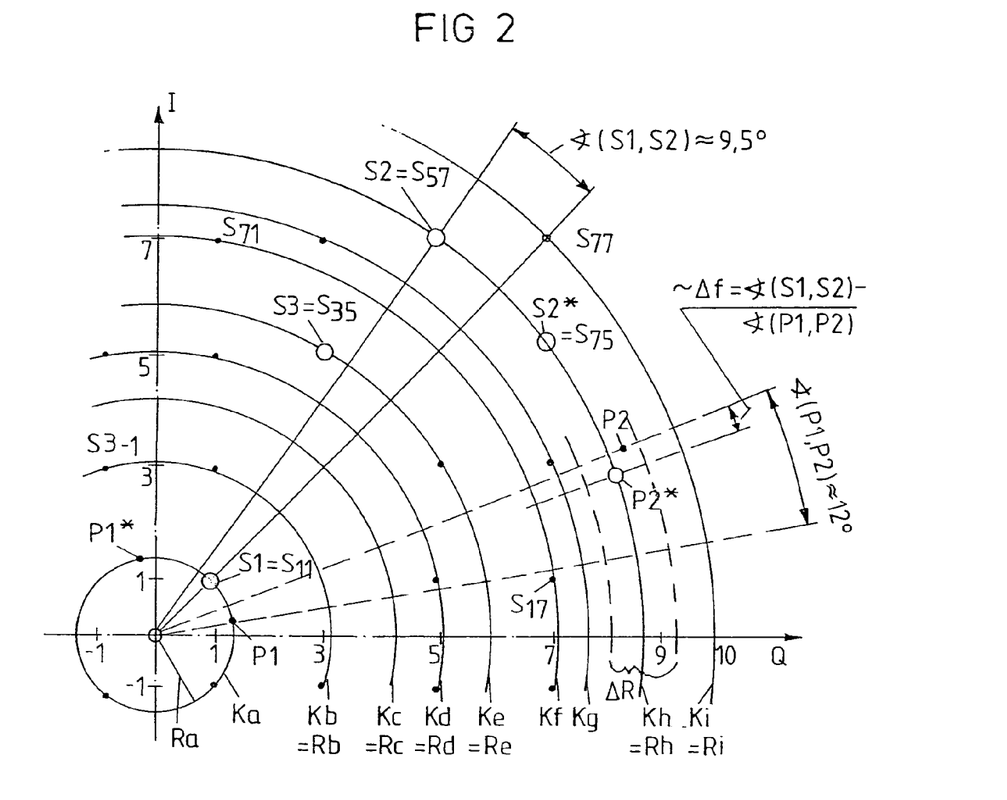
FIG. 2 is a graphical representation of signal and symbol positions in the complex plane with angle relationships between selected symbols.

Before describing the sequence of the method of determining the frequency or carrier frequency for demodulating the received signal s with symbols Se, we shall first describe by FIG. 2 the distribution of symbols in the complex Cartesian space I, Q with the coordinates x, y. This also shows the corresponding coordinates R, $\alpha$ in the polar coordinate space.

The Cartesian coordinate plane established by a quadrature signal pair I, Q represents symbols $S_{xy}$ of a 64-QAM signal, whose corresponding positions in one quadrant are indicated. The indices x,y correspond to the particular Cartesian coordinates used to determine the symbols in an ideal sampling. Also depicted are nine circles Ka, Kb, Kc, ..., Ki, on which the symbols $S_{xy}$ lie by the rules of the 64-QAM-method. The circles Ka, Kb, Kc are coordinated with radius values $R_a = 1.41$; $R_b = 3.16$ and $R_c = 4.24$, calculated from the origin of the coordinates. To define the symbols $S_{xy}$ in terms of their polar coordinates R, $\alpha$ one needs the particular angle components $\alpha$. These are, for example, 45° for the symbols $S_{11}$ and $S_{33}$ and 71.7° and 18.3° for the symbols $S_{13}$ and $S_{31}$. The calculation of the polar coordinates is done in the above-described circuit arrangement in the coordinate converter 51. The conversion into polar coordinates is especially useful when considering the angle relationships between individual symbols.

FIG. 2 shows, for example, two nominal symbols S1 and S2 at the nominal positions $S_{11}$ and $S_{57}$ in the Cartesian coordinate system. Lines are drawn from the origin to these nominal positions. The angle between the lines gives the nominal angle $\angle(S_{xy}, S_{x'y'})$.

In the table stored in the memory 54 (FIG. 1), the nominal angles $\angle(S_{xy}, S_{x'y'})$ between all possible nominal positions of the various symbols are listed (e.g., $\angle$(S1, S2)). Advantageously, each symbol is also coordinated with the information as to the radius Ra, Rb, . . . . Ri on which the symbol is arranged. As an alternative to a large table with preferably all possible angle combinations for the nominal angles, one can of course also indicate the positional angle information for all symbol positions so that the nominal angle coordinated with any given combination can be determined by a simple forming of the difference.

In the method described hereafter, it is assumed that fixed difference angles $\angle$(S1, S2) exist between fixed symbols S1, S2. The momentary angle position of a received signal space relative to the coordinate system with the nominal symbols can be considered irrelevant, since even within the received signal space this angle relationship between individual received signal values stands in the same ratio as the nominal angles between the nominal symbols. Using the reception angle $\angle$(P1, P2) between the positions of two received signal values P1 and P2 thus corresponds with highest probability, independently of the spatial position of the received signal space at the moment, to a corresponding nominal angle $\angle$(S1, S2) between two corresponding symbols S1, S2.

Because one uses, not absolute angle positions, but only difference angles $\angle$(P1, P2) between two received signal values P1, P2 and a nominal angle $\angle$(S1, S2) of two corresponding symbols S1, S2, there is a very large capture range when generating a proper frequency correction signal for the carrier frequency. FIG. 2 shows the corresponding line for the received symbols P1, P2 by dashes, in order to distinguish it.

While the nominal angle $\angle$(S1, S2) and $\angle(S_{11}, S_{57})$ is, for example, 9.5° according to the table entry, the measured angle $\angle$(P1, P2) between the received signal values P1 and P2 is, however, 12°. When considering the possible angle relationships for the present 64-QAM modulation method, there are also other possible symbol combinations inside a tolerance range for a difference angle $\angle$(P1, P2). For example, the nominal angle $\angle$(S1,S3) or $\angle(S_{11}, S_{35})$ between the symbol $S_{11}$ and the symbol S3 or $S_{35}$ is 14°. Within a tolerance range, as the example shows, it is still not possible to assign the angle $\angle$(P1, P2) of the received signal values P1 and P2 to a nominal angle with absolute certainty.

Advantageously, when the coordination possibilities are not sufficiently certain, one can consider as a further criterion the radius R of the received signal values P1, P2. When using the radii Ra, Rb, . . . , Ri, the table clearly shows that the signal P2 can be coordinated with either the symbol $S_{57}$ or the symbol $S_{75}$. Using both the difference angle $\angle$(P1, P2) and the radius of P2 allows only the symbol $S_{57}$ as the second partner of the pair (S1, S2), and so the nominal difference angle $\angle(S_{11}, S_{57})$ is 9.5 degrees, which amounts to an angle deviation of 12 degrees−9.5 degrees=+2.5 degrees. This angle deviation, as a ratio of the full circle and multiplied by the symbol frequency $f_{Symbol}$, is the frequency deviation between the received carrier and the local oscillator 7 of the circuit arrangement 1, i.e., $\Delta f$=2.5 degrees/360 degrees*$f_{Symbol}$.

As can be seen from FIG. 2, the second received signal value P2 is not located exactly on a nominal radius. Therefore, it is advisable to set up tolerance ranges around each nominal radius, within which it is assumed that the received signals belong to a symbol on this nominal radius. In this way, the number of nominal difference angles to be considered for the comparison of the measured difference angle is accordingly reduced. The tolerance ranges can be configured so that, with special advantage, they go as far as half the distance to the neighboring nominal radius and define a decision-making boundary there. They can also be formed by a fixed or a variable radius difference, for example one that can be adapted to the reception conditions, and that can also be different in the directions of larger and smaller radii. The tolerance ranges so formed can also overlap, which means that correspondingly more nominal difference angles need to be considered for the decision. Signal values in the vicinity of closely neighboring radii or signal values otherwise uncertain in their evaluation can also be excluded by the evaluation. Moreover, a consideration only within certain tolerance difference angles might be advisable for a further restriction in the case of higher-order modulation methods.

After determining the frequency offset $\Delta f$, one can make a direct correction of the second received signal value P2 to the correct position of the correct signal value P2*. It is also possible to continue using the determined frequency offset $\Delta f$ in the comparator 55, so as to use this frequency offset $\Delta f$ from the start as a correction quantity for subsequent processing steps.

Since using the angle deviation between the angles of received signals and nominal angles of corresponding symbols is dependent on the quadrant of the complex plane, one can advantageously rotate all the received signals into a single quadrant of the complex plane, as is sketched for the example of the received symbol P1*, and map position angles onto a region between 0° and 90° or difference angles correspondingly onto a region between −90° and +90°.

Thus, advantageously, no direct decision will be made for a received complex signal as to a symbol in the alphabet, but instead one first determines the nominal radii occurring in the symbol alphabet that are possible for each signal value. One then determines, for two directly consecutive or spaced apart signal values P1, P2, the angle $\angle$(P1, P2). For this angle, preferably taking into account the possible coordinated radii, a comparison is made with all occurring nominal angles $\angle$(S1, S2), such as might produce any given combination of the nominal points on radii that are possible for the first signal values P1 and radii that are possible for the second signal values P2. After deciding on one nominal angle $\angle$(S1, S2), found from the table, as that coming closest to the measured angle $\angle$(P1, P2), the received symbols and corresponding signal values P1, P2 are identified independently of the momentary position in the phase space.

Figure 3:
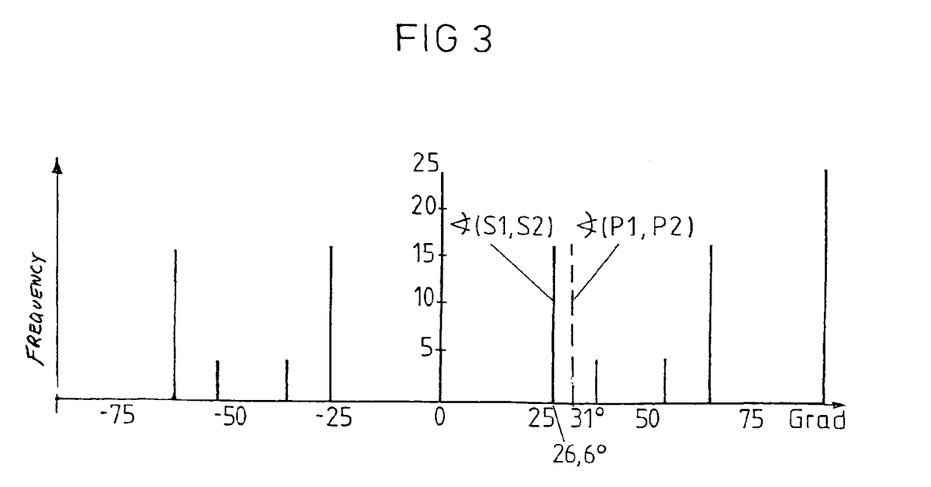
FIG. 3 is a plat of possible difference angles between received signals and symbols as a function of angle.

The angle deviations of the angles $\angle$(P1, P2) from the most likely nominal angles $\angle$(S1, S2) of different received signal pairs will be the same and give a direct measure of the frequency deviation, as is apparent from FIG. 3. The absolute angle position of the actual symbols or nominal symbols is irrelevant here. FIG. 3 shows a mapping of a 16-QAM-system of all possible angles $\angle$(S1, S2) between points of a quadrant on all the radii. The mapping is a frequency distribution over the angle domain, expressed in degrees. Once again, solid lines show corresponding positions in the nominal coordinate system, while a dashed line shows a reception angle $\angle$(P1, P2) in the rotated reception coordinate system. The nominal angles are at −63.4°, −53.1°, −36.9°, −26.6°, 0°, 26.6°, 36.9°, 53.1° and 63.4°. 90° corresponds to 0°. The sample measured angle ∠(P1, P2) of the received signals P1 and P2 with an angle of 31° is quite evident. In this example, the nominal angle of 26° is included in the set determined by the possible radii for preselection. The difference angle of 4.4° between the nominal angle ∠(S1, S2) at 26.6° and the determined angle ∠(P1, P2) at 31° of the received signal values P1, P2 is easy to determine with the help of such a diagram, also a mathematical diagram, for subsequent use in the frequency correction. When considering several difference angles from consecutive measurements, one can also take the average or make a selection of the angle deviations in order to average out or discard individual outliers. Furthermore, one may consider difference angles between certain angles of various measured signal pairs and corresponding angles of coordinated nominal symbol pairs.

One can also consider a concatenation of individual angle determinations for consecutive pairs, for example, by using the familiar Viterbi algorithm. This produces correct results even for high frequency deviations or when several neighboring radii are included in the decision making. Wrong decisions by assigning a determined angle to a wrong nominal angle may occur at times when frequency errors are very large, so that the rotation of the coordinate system between two symbols is on the order of magnitude of the difference angle of two neighboring symbols S2, S2* on the same radius Rh.

The angle decisions thus obtained also identify the symbols Se involved and possibly interpolated during the preprocessing, especially when using concatenated decision making that considers several determined angles or involves the radius information in the decision making. Therefore, the process sequence or a corresponding algorithm leads to a demodulation or symbol determination already during the synchronization phase, without having to first carry out a frequency correction. Furthermore, it is possible to use the absolute angle information of the received signal, obtained from the identification of the symbols involved in the difference formation, for the corresponding nominal symbol for the phase regulation.

If the angle treatment was done in only one quadrant, for example, a received symbol P1* was moved from the second to the first quadrant, it is then rotated back to the proper quadrant already during the synchronization phase of the circuit arrangement 1, in order to make possible a direct further processing of the symbols so determined in subsequent processing devices.

After compensating for the frequency difference and possibly also the phase difference between the carrier of the reception signal and the local oscillator 7, it is advisable to lock in the carrier-phase-coupled loop by sending the phase difference signal Δγ, obtained in familiar fashion by conventional symbol decision-making, to the carrier control unit 8. The carrier control circuit 8 is connected so that the frequency difference information from the initial frequency control, for example in the integrator 84, remains intact even after this switching to phase control with the angle error Δγ as the input signal.

The individual skilled in the art will be able to construct various alternative circuit arrangements to implement the method. For example, the clock controller 21 can provide a centrally regulated sampling and digitization clock cycle in the form of the sampling signal $t_i$, which is taken to the AD converter 3. If the sampling signal $t_i$ is synchronized to the clock cycle for the received symbol or signal sa, a later interpolation in the sampling device 10 is unnecessary. The low-pass filter 9 after the quadrature converter 6 is then also no longer required. Its limiting action is taken over by the low-pass 11 with the Nyquist characteristic. In particular, in alternative embodiment arrangements it is also possible to employ the interface for the digitization, i.e., the AD converter, only after the quadrature converter 6, for example in cases where the intermediate frequency position of the input signal sa furnished by the signal source 2 is too high.

Figure 4:
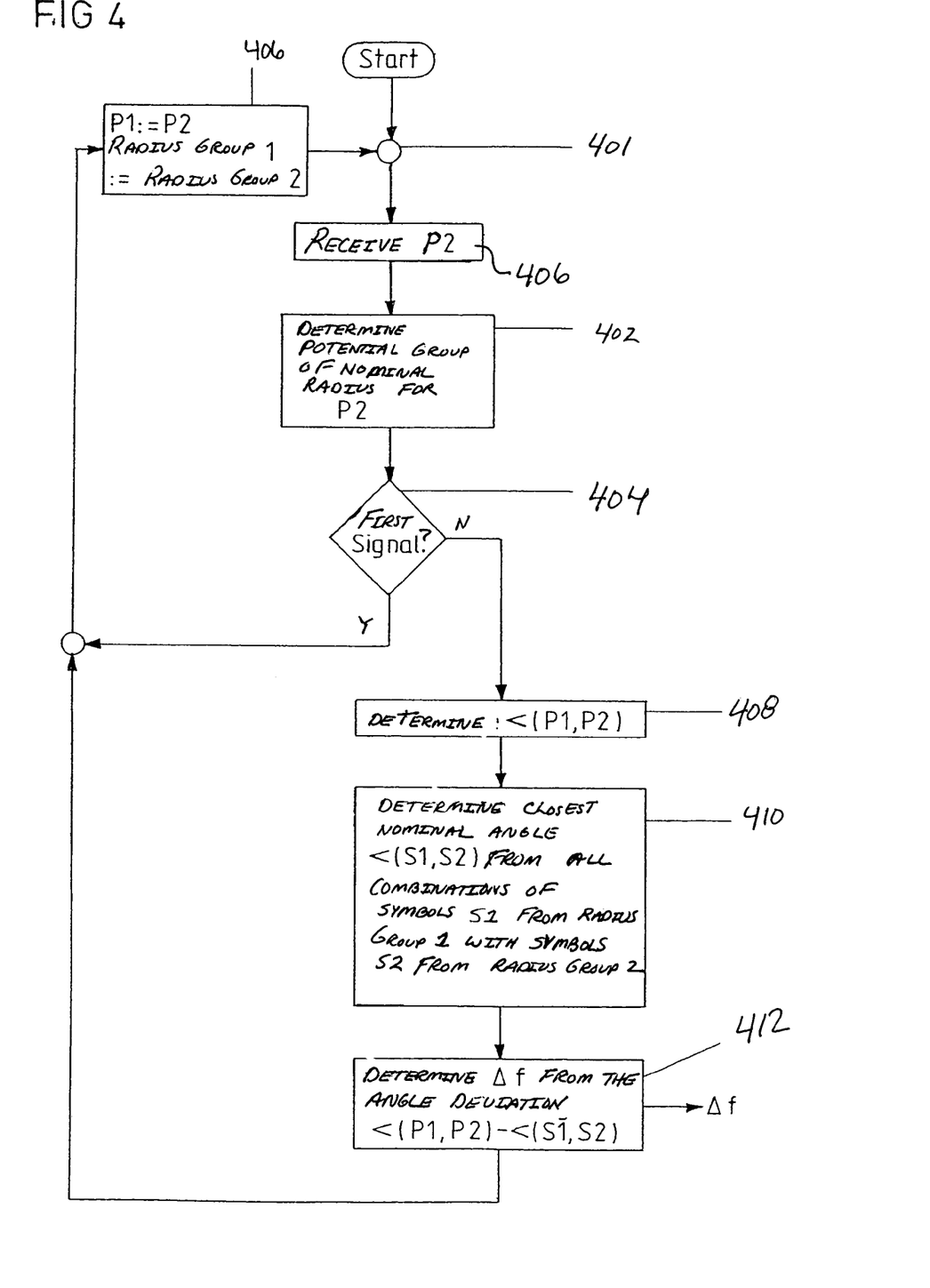
FIG. 4 is a flowchart illustration of a frequency determination method.

In a process sequence and according to FIG. 4, after the Start one begins with the reception of symbols P1, P2 in step 401. After this, a potential group of nominal radii is determined for the received symbol P2 in step 402. If it is the first signal or symbol, a return occurs in an inquiry step 404. If it is the first signal, step 406 the first symbol P1 is set equal to the received symbol P2 and the group of nominal radii determined in the fourth step 402 is defined as the first radius group. The method will then continue with in step 406 with the reception of signal values or symbols P2.

If step 404 does not involve the first signal, in step 408 the difference angle ∠(P1, P2) is determined between the signal values or symbols (S*7). Then in step 410, the closest nominal angle ∠(S1, S2) from all combinations of symbols S1 of the first radius group with symbols S2 of the second radius group is determined. Finally, from this angle deviation (∠(P1, P2)−∠(S1, 2)) a conclusion in step 412 is drawn as to the frequency offset Δf. This frequency offset Δf is put out. Moreover, one returns to the step of establishing the basic parameter 406 and receiving of symbols.

Although the present invention has been shown and described with respect to several preferred embodiments thereof, various changes, omissions and additions to the form and detail thereof, may be made therein, without departing from the spirit and scope of the invention.

What is claimed is:

1. A method for determining the frequency of a received signal for demodulating received signal values (P1, P2) in the complex phase space (I, Q) of a modulation technique wherein for the frequency determination the received signal values (P1, P2) are compared with symbols (S1, S2) at nominal positions in the complex signal space, the method comprising:

converting a first received signal value P1 and a second received signal value P2 of a quadrature amplitude modulated signal from Cartesian coordinate space to polar coordinate space to provide a first radial component and a first angle component indicative of the first received signal value P1 and a second radial component and a second angle component indicative of the second received signal value P2;

determining the difference between the first angle component and the second angle component and providing a difference signal indicative thereof;

comparing the difference signal against a plurality of nominal angles associated with the modulation technique and determining which of the plurality of nominal angles is closest to the difference signal as a measure for a frequency offset (Δf) and providing a first control signal indicative thereof; and comparing an equalized signal (S) and an estimated symbol (Se) to provide an angle error signal;

controlling a voltage controlled oscillator using the first control signal when the value of the first control signal is greater than a threshold value, otherwise controlling the voltage controlled oscillator using a second control signal indicative of the angle error signal;

where the converting, the determining, the comparing the received signal values, comparing the difference signal and the controlling are implemented in a circuit arrangement configured for demodulation.

2. The method of claim 1, wherein the difference angle is determined for the first and second signal values P1, P2 received in succession at predetermined intervals and compared to correspondingly possible nominal angles.

3. The method of claim 1, wherein the difference angle is determined for the first and second received signal values P1, P2 in the range of various possible radii for the quadrature modulation method and compared to nominal angles.

4. The method of claim 1, wherein the difference angle is determined for received signal values on the most unambiguously determinable radii in the symbol alphabet.

5. The method of claim 1, wherein the difference angle is determined for received signal values P1, P2 in the region of positions of selected nominal symbols (S1, S2).

6. The method of claim 1, wherein a plurality of angles is determined, compared, and considered in common to determine the frequency offset ($\Delta f$), for a joint and/or iterative improvement of the frequency determination.

7. The method of claim 1, wherein the difference angle is used for the onetime frequency correction and demodulation and/or as input signal for a future frequency control.

8. The method of claim 1, wherein the information derived from the difference angle is used to identify the symbols involved.

9. The method of claim 6, wherein the positions of received symbols are mapped in a single quadrant of the complex plane (I, Q) to determine the difference angle.

10. The method of claim 9, wherein after determining the difference angle in only one quadrant, the signs of a determined symbol are added back appropriately or the symbol is again rotated into the proper quadrant.

11. The method of claim 9, wherein only received signal values (P1, P2) within tolerance ranges ($\Delta R$) about possible nominal radii are considered.

12. The method of claim 11, wherein received signal values (P1, P2) within the tolerance ranges ($\Delta R$) about possible nominal radii are coordinated with radius groups and used to define a selection of nominal angles.

13. A system for determining the frequency of a received signal for demodulating received signal values (P1, P2) in the complex phase space of a modulation technique wherein received signal values (P1, P2) are compared with symbols (S1, S2) at nominal positions in the complex signal space, the system comprising:

an angle error determining unit that receives and compares an equalized signal (S) and an estimated symbol (Se) to provide an angle error signal;

a frequency determining device that determines the angle between two received signal values (P1, P2) in the complex plane;

a nominal angle managing device that stores nominal angles for different combinations of symbols (S1, S2) corresponding to nominal positions for the quadrature modulation method and optional storing of coordinated radii;

a comparator that assigns the determined angle to at least one nearby corresponding nominal angle from the nominal angle managing device and determines an angle deviation between these as a measure of frequency offset ($\Delta f$) and provides a first control signal indicative thereof; and means for controlling a voltage controlled oscillator using the first control signal when the value of the first control signal is greater than a threshold value, otherwise controlling the voltage controlled oscillator using a second control signal indicative of the angle error signal.

14. The system of claim 13, where the means for controlling comprises a proportional and integral controller that receives the first and second control signals and provides a voltage control signal to the voltage controlled oscillator.

15. A method for determining the frequency of a received signal for demodulating received signal values (P1, P2) in the complex phase space (I, Q) of a modulation technique wherein for the frequency determination the received signal values (P1, P2) are compared with symbols (51, S2) at nominal positions in the complex signal space, the method comprising:

converting a first received signal value P1 and a second received signal value P2 of a quadrature amplitude modulated signal from Cartesian coordinate space to polar coordinate space to provide a first radial component and a first angle component indicative of the first received signal value P1 and a second radial component and a second angle component indicative of the second received signal value P2;

determining the difference between the first angle component and the second angle component and providing a difference signal indicative thereof;

comparing the difference signal against a plurality of nominal angles associated with the modulation technique and determining which of the plurality of nominal angles is closest to the difference signal as a measure for a frequency offset ($\Delta f$) and providing a first control signal indicative thereof; and comparing an equalized signal (S) and an estimated symbol (Se) to provide an angle error signal;

controlling a voltage controlled oscillator using the first control signal when the value of the first control signal is greater than a threshold value, otherwise controlling the voltage controlled oscillator using a second control signal indicative of the angle error signal;

where the converting, the determining, the comparing the received signal values, comparing the difference signal and the controlling are performed in a circuit arrangement, wherein the difference angle is determined for the first and second received signal values P1, P2 in the range of various possible radii for the quadrature modulation method and compared to nominal angles.

* * * * *